United States Patent
Jeong et al.

(10) Patent No.: US 7,093,378 B2
(45) Date of Patent: Aug. 22, 2006

(54) MOTOR SUPPORTING APPARATUS OF CLOTHING DRIER

(75) Inventors: In Cheol Jeong, Gyeonggi-Do (KR); Dae Yun Park, Gyeonggi-Do (KR); Young Hwan Park, Seoul (KR); Dong Beom Lee, Gyeongsangnam-Do (KR); Kyung Seop Hong, Incheou (KR); Si Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/756,370

(22) Filed: Jan. 14, 2004

(65) Prior Publication Data

US 2005/0050764 A1    Mar. 10, 2005

(30) Foreign Application Priority Data

Aug. 12, 2003    (KR) ............... 10-2003-0055663

(51) Int. Cl.
    *F26B 11/02*    (2006.01)
(52) U.S. Cl. ............... 34/601; 415/204; 310/51; 310/91
(58) Field of Classification Search ............... 34/595, 34/601, 602; 415/204, 119; 68/184; 310/51, 310/89, 91, 254; 248/674, 675; 384/192, 384/256, 416, 428, 444
See application file for complete search history.

(56) References Cited

U.S. PATENT DOCUMENTS

| | | | | |
|---|---|---|---|---|
| 2,910,890 A | * | 11/1959 | Mellinger | 474/72 |
| 3,685,773 A | * | 8/1972 | Otto | 248/606 |
| 3,983,429 A | * | 9/1976 | Allardice, Jr. | 310/91 |
| 4,306,841 A | * | 12/1981 | Morrison et al. | 417/360 |
| 4,328,600 A | * | 5/1982 | Bochan | 8/159 |
| 5,203,093 A | * | 4/1993 | Baker | 34/601 |
| 5,915,922 A | * | 6/1999 | Wiethe et al. | 415/204 |
| 6,023,838 A | * | 2/2000 | Yamakoshi et al. | 29/596 |

FOREIGN PATENT DOCUMENTS

EP    0 327 087 A    8/1989

* cited by examiner

*Primary Examiner*—S. Gravini
(74) *Attorney, Agent, or Firm*—Birch, Stewart, Kolasch & Birch, LLP

(57) ABSTRACT

Disclosed is a motor supporting apparatus of a clothing drier comprising: first and second motor hubs respectively protruding at both sides of a motor; a supporting rib formed at a case for supporting the first motor hub; and a supporting member assembled at a lateral surface of the case by a sliding method for supporting the second motor hub. The apparatus simplifies assembly processes, enhances a mass production characteristic, and simplifies a service performance by improving a motor supporting structure and thereby enabling assembly/disassembly of a motor without disassembling a drum.

20 Claims, 9 Drawing Sheets

MOTOR SUPPORTING APPARATUS OF CLOTHING DRIER

This Nonprovisional application claims priority under 35 U.S.C. § 119 (a) on Patent Application No(s). 10-2003-0055663 filed in KOREA on Aug. 12, 2003, the entire contents of which are hereby incorporated by reference.

BACKGROUND OF THE INVENTION

1. Field of the Invention

The present invention relates to a clothing dryer, and more particularly, to a motor supporting apparatus of a clothing dryer capable of increasing an assembly characteristic and a mass production characteristic by easily detaching and mounting a motor.

2. Description of the Conventional Art

Generally, a clothing dryer is divided into a condensing type for circulating air, an exhausting type for exhaust air to outside, and etc.

FIG. 1 is a construction view of a general condensing type clothing dryer.

As shown, the clothing dryer comprises a case 100, a drum 102 rotatably mounted in the case 100 for drying clothing, a circulation duct 104 connected between a front side and a rear side of the drum 102 for supplying heated air to the drum 102 and circulating air which has finished a drying operation in the drum 102, a condenser 106 installed in the circulation duct 104 for removing moisture contained in air exhausted from the drum 102, a circulation fan 108 for forcibly circulating air through the circulation duct 104, and a heater (not shown) for heating air supplied to the drum 102.

The condenser 106 is composed of an air passage 110 for passing external air and an air passage 112 for passing air exhausted from the drum 102 which are stacked each other, and removes moisture contained in circulation air exhausted from the drum 102 after being condensed.

Also, the case 100 is provided with an air inlet 116 for introducing external air supplied to the condenser 106, and a cooling fan 118 for sucking air into the air inlet 116. The case is also provided with a motor 120 for driving the circulation fan 108 and the cooling fan 118 and rotating the drum 102, and the motor 120 is fixed to a bottom surface of the case 110 by a supporting apparatus.

FIG. 2 is a lateral view showing an arrangement structure of a motor and a drum of a clothing dryer in accordance with the conventional art, FIG. 3 is a lateral view showing a motor supporting apparatus in accordance with the conventional art, and FIG. 4 is an upper lateral view showing the motor supporting apparatus in accordance with the conventional art.

The conventional motor 120 is mounted at a lower side of the drum 102, and is provided with a rotation shaft 130 arranged at both sides thereof and respectively connected to the circulation fan 108 and the cooling fan 118. The motor is supported at the case 100 by a supporting apparatus.

The motor supporting apparatus comprises two supporting members 150 uprightly fixed to a bottom surface of the case 100 with a certain interval; a motor hub 152 respectively protruding from both lateral surfaces of the motor 120 and mounted to an upper surface of the supporting member 150; and a frame 156 covering the motor hub 152 and then coupled to the supporting member 150 by a coupling bolt 154, for supporting the motor hub 152 to the upper surface of the supporting member 150.

A vibration-proof rubber 158 for preventing vibration of the motor 120 from being transmitted to the case 100 is installed at an outer circumferential surface of the motor hub 152.

In the conventional motor supporting apparatus, the supporting member 150 is fixed to the bottom surface of the case 100, and then the motor hub 152 protruding from both sides of the motor 120 is mounted at the upper surface of said two supporting members 150. Next, the frame 156 covers the motor hub 152 thereon, and then the coupling bolt 154 is coupled from an upper side direction to a lower side direction thus to fix an interval between the frame 156 and the supporting member 150.

However, in the conventional motor supporting apparatus of a clothing dryer, the coupling bolt is coupled between the frame and the supporting member from the upper side to the lower side, and the drum having a large diameter is arranged at an upper side of the motor. Accordingly, in case of disassembling the motor, the drum has to be first removed to unfix a coupling screw, thereby having complicated assembly processes, lowering an assembly characteristic, and lowering a mass production characteristic.

SUMMARY OF THE INVENTION

Therefore, an object of the present invention is to provide a motor supporting apparatus of a clothing dryer capable of simplifying assembly processes, enhancing a mass production characteristic, and simplifying a service performance by improving a motor supporting structure and thereby enabling assembly/disassembly of a motor without disassembling a drum.

To achieve these and other advantages and in accordance with the purpose of the present invention, as embodied and broadly described herein, there is provided a motor supporting apparatus of a clothing dryer comprising: first and second motor hubs respectively protruding at both sides of a motor; a supporting rib formed at a case for supporting the first motor hub; and a supporting member assembled at a lateral surface of the case by a sliding method for supporting the second motor hub.

The supporting rib is provided with a hub mounting portion of a cylindrical shape for inserting the first motor hub, and is integrally formed at the case.

The supporting member comprises: a body uprightly arranged at a bottom surface of the case; a hub supporting portion formed at an upper side of the body for inserting the second motor hub and supporting; and a sliding coupling portion sliding-coupled to the case.

A bolt coupling portion bolt-coupled to the body after the sliding coupling portion is sliding-coupled to the body is formed at a front side of the body.

The sliding coupling portion is formed as a circular arc shape having the same diameter at a center of the hub supporting portion, and an engaging groove engaged to the case is formed in a length direction thereof.

An insertion groove of a circular arc shape for inserting the sliding coupling portion is formed at the case, and a guide rib coupled to the engaging groove is formed at both sides of the insertion groove in a length direction thereof.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, preferred embodiments of a motor supporting apparatus of a clothing dryer according to the present invention will be explained.

Figure 5:
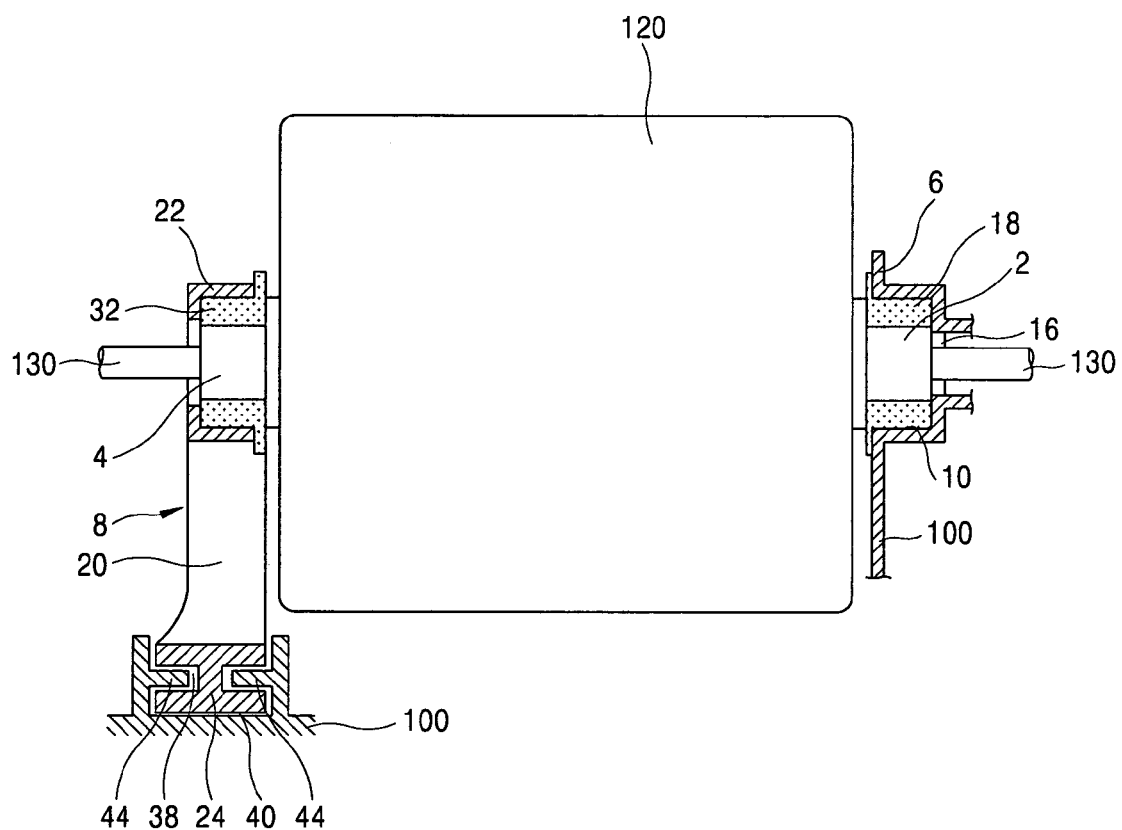
FIG. 5 is a sectional view showing a motor supporting apparatus of a clothing dryer according to the present invention.

FIG. 5 is a sectional view showing a motor supporting apparatus of a clothing dryer according to the present invention.

Figure 1:
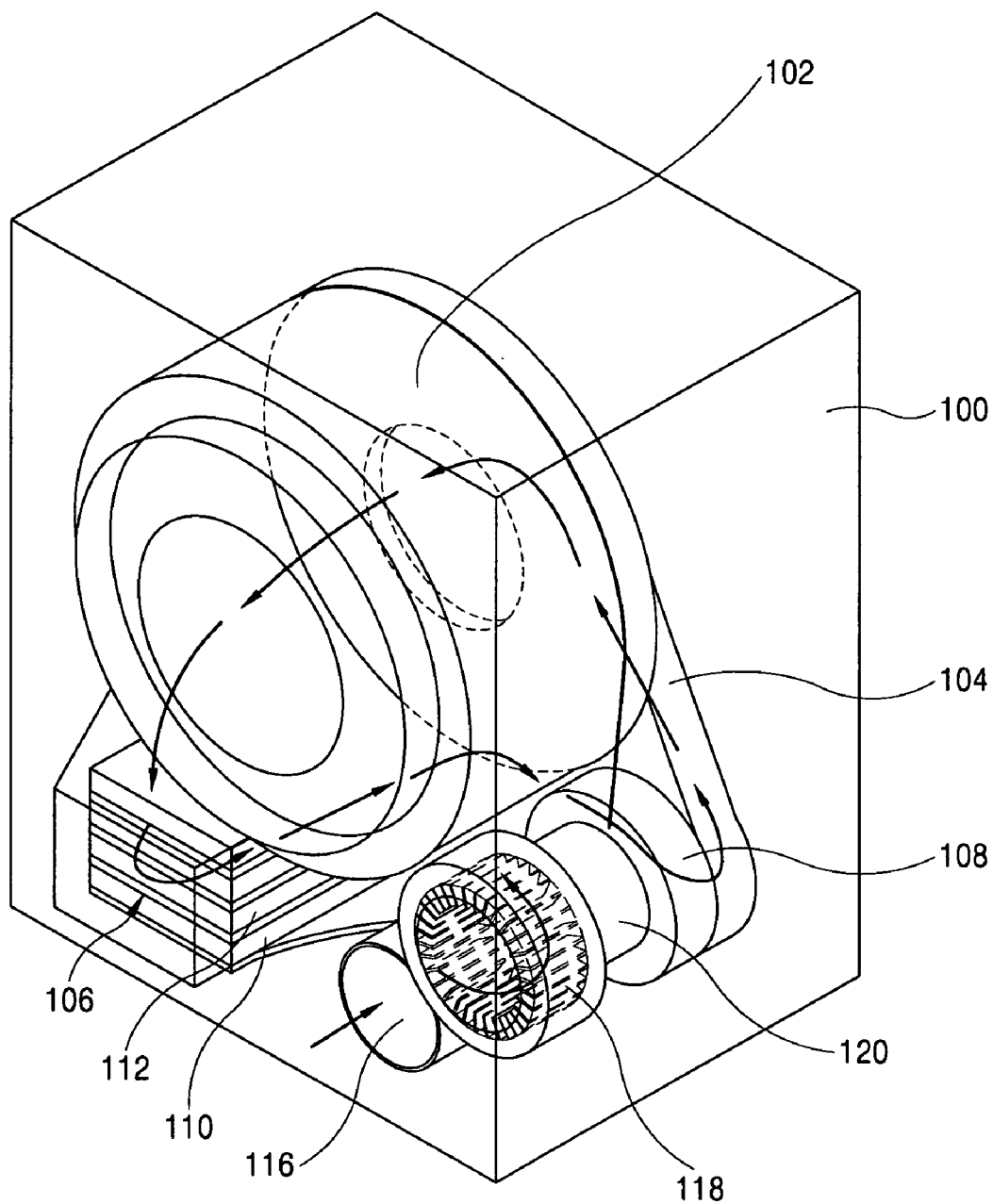
FIG. 1 is a construction view of a general clothing dryer.
Figure 2:
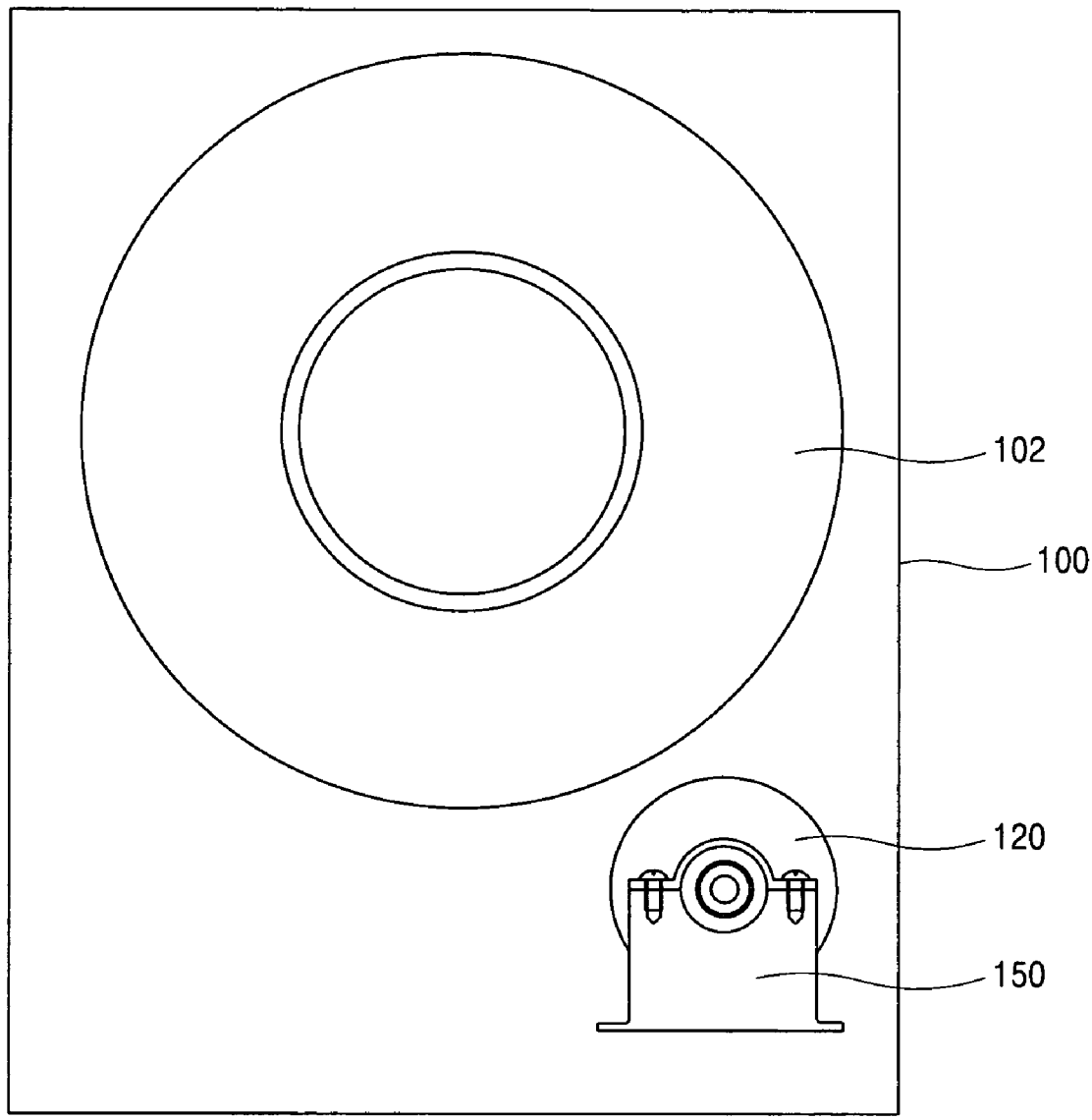
FIG. 2 is a lateral view showing an arrangement structure of a motor and a drum of a clothing drier in accordance with the conventional art.
Figure 3:
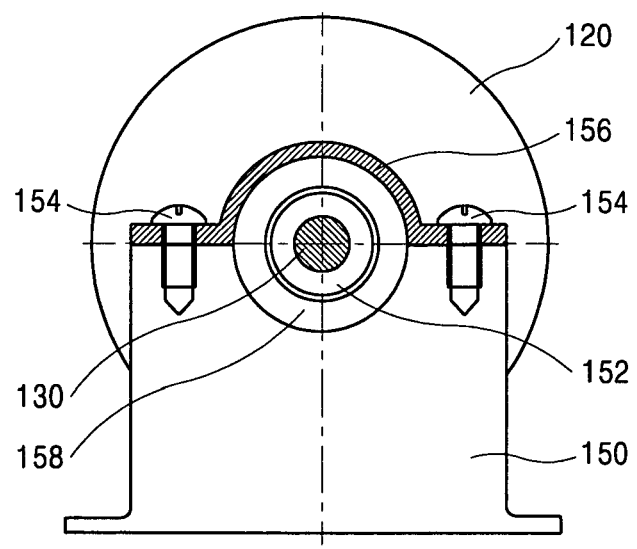
FIG. 3 is a lateral view showing a motor supporting apparatus in accordance with the conventional art.
Figure 4:
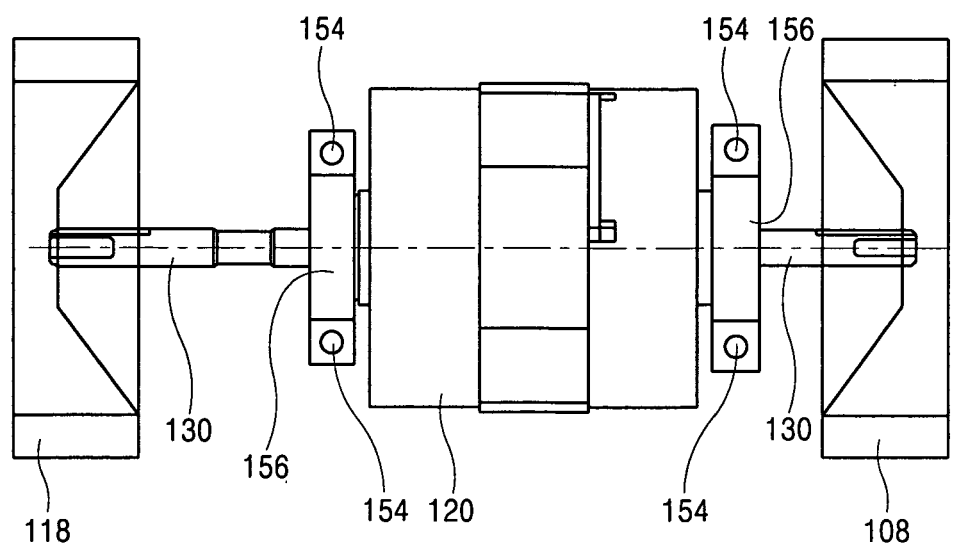
FIG. 4 is an upper lateral view showing the motor supporting apparatus in accordance with the conventional art.

The clothing dryer according to the present invention, as shown in FIG. 1, comprises: a drum 102 rotatably mounted in the case 100 for drying clothing; a circulation duct 104 connected between a front side and a rear side of the drum 102 for supplying heated air to the drum 102 and circulating air which has finished a drying operation in the drum 102; a condenser 106 having a cooling fan 118 for removing moisture contained in air exhausted from the drum 102; a circulation fan 108 for forcibly circulating air through the circulation duct 104; and a motor 120 for driving the cooling fan 118 and the circulation fan 108 and for rotating the drum 102.

The motor 120 is provided with a rotation shaft 130 for driving the cooling fan 118 and the circulation fan 108 at both sides thereof, and a first motor hub 2 and a second motor hub 4 for respectively supporting the rotation shaft 130 are formed at both side surfaces of the motor 120. The first motor hub 2 and the second motor hub 4 are provided with a motor supporting apparatus, thereby fixing the motor 120 to the case 100.

The motor supporting apparatus is composed of a supporting rib 6 for inserting the first motor hub 2 and supporting, and a supporting member 8 for supporting the second motor hub 4.

The supporting rib 6 is provided with a hub mounting portion 10 of a cylindrical shape for inserting the first motor hub 2, and is integrally formed at an inner side of the case 100. The supporting rib 6 is provided with a penetration hole 16 for passing the rotation shaft 130.

A vibration-proof member 18 for minimizing a transmission of vibration generated from the motor 120 to the case 100 is installed between an outer circumferential surface of the first motor hub 2 and an inner circumferential surface of the hub mounting portion 10.

Figure 6:
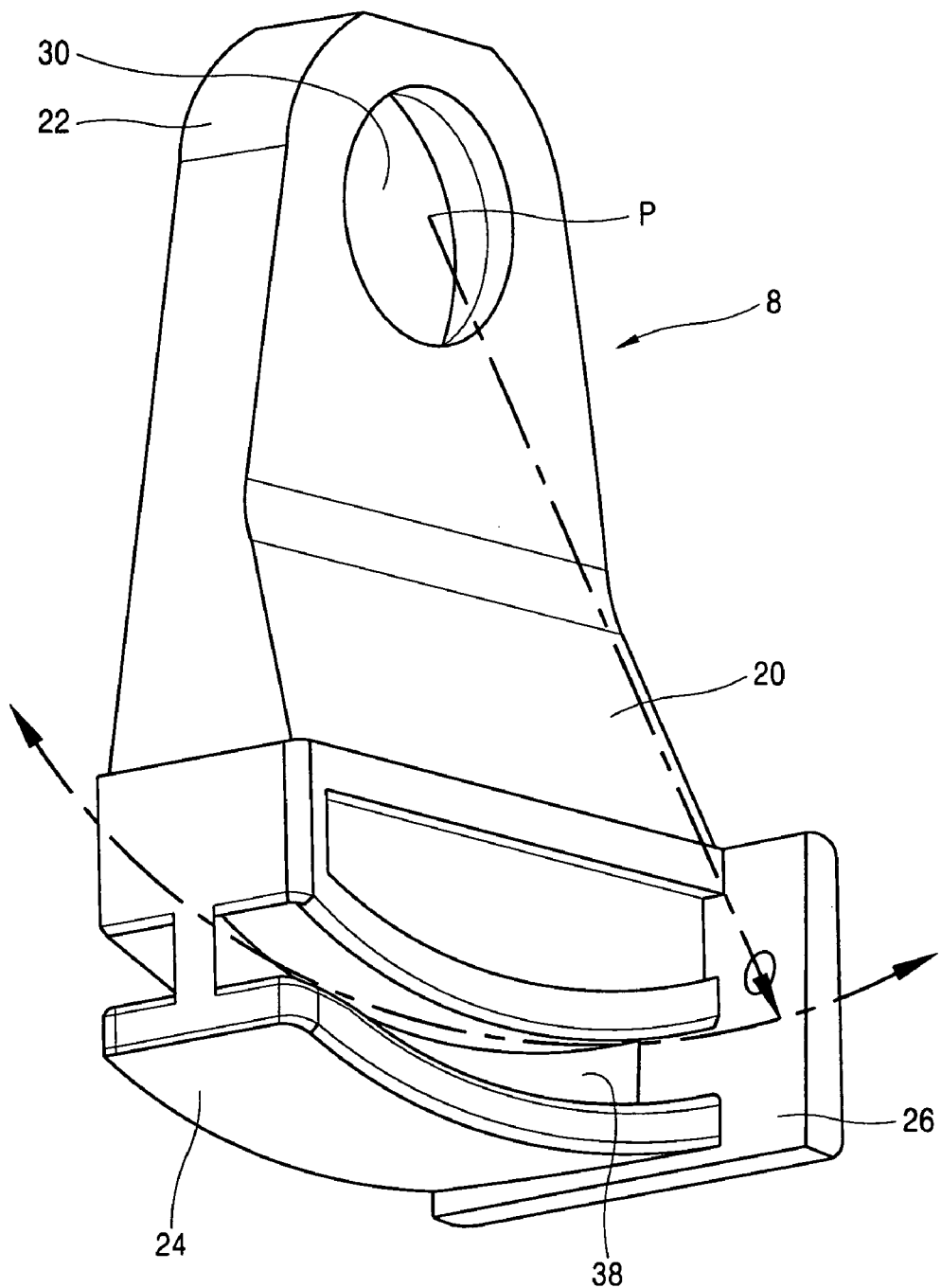
FIGS. 6 and 7 are perspective views showing a supporting member of the motor supporting apparatus of a clothing dryer according to the present invention.
Figure 7:
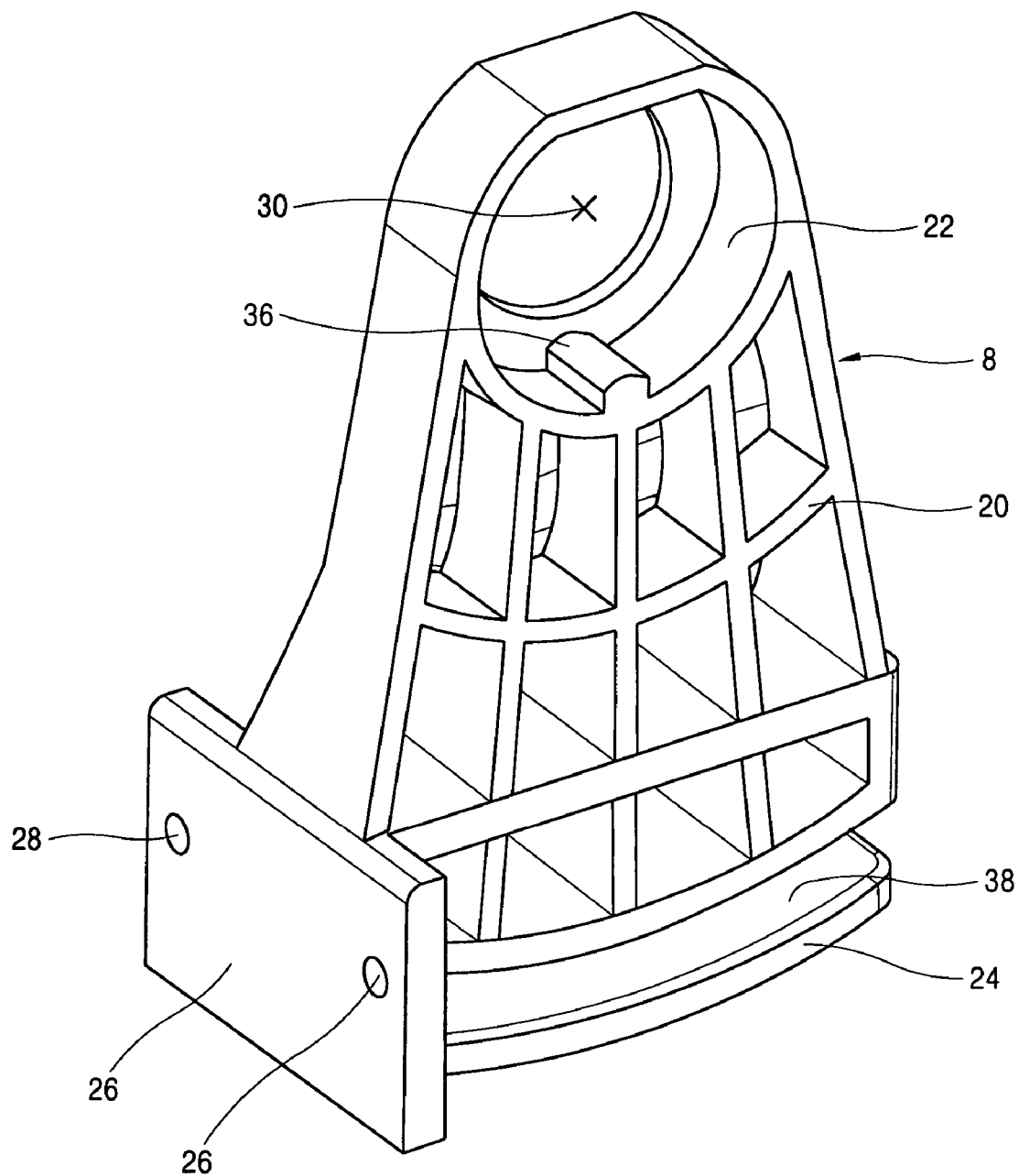

As shown in FIGS. 6 and 7, the supporting member 8 comprises: a body 20 uprightly arranged at a bottom surface of the case 100; a hub supporting portion 22 formed at an upper side of the body 20 for inserting the second motor hub 4 and supporting; and a sliding coupling portion 24 formed at a lower side of the body 20 and sliding-coupled to the case 100.

A bolt coupling portion 26 for bolt-coupling the supporting member 8 to the case 100 after the sliding coupling portion 24 is sliding-inserted into the case 100 is formed at a front side of the body 20.

The bolt coupling portion 26 is integrally formed at a front side of the body 100 as a flat plate shape and has a plurality of bolt coupling holes 28. Accordingly, the bolt coupling portion 26 bolt-couples the supporting member 8 toward a lateral direction of the case 100 after assembling the supporting member 8 to the case 100.

The hub supporting portion 22 is formed as a cylindrical shape to insert the second motor hub 4, and is provided with a penetration hole 30 for passing the rotation shaft 130 at one side thereof. A vibration-proof member 32 for preventing vibration generated from the motor 120 from being transmitted to the case 100 is installed between an outer circumferential surface of the second motor hub 4 and an inner circumferential surface of the hub supporting portion 22. Also, an engaging portion 36 to which the vibration-proof member 32 is inserted and rotated together is formed at an inner circumferential surface of the hub supporting portion 22.

The sliding coupling portion 24 is formed as a circular arc shape having the same radius R from a center P of the penetration hole 30 in order to be sliding coupled to the case 100 when the body 20 is rotated in a state that the hub supporting portion 22 is inserted into the first motor hub 4. The sliding coupling portion 24 is provided with an engaging groove 38 of a circular arc shape sliding inserted into the case 100 at both sides thereof, and preferably has a sectional surface of an 'I' shape.

Figure 8:
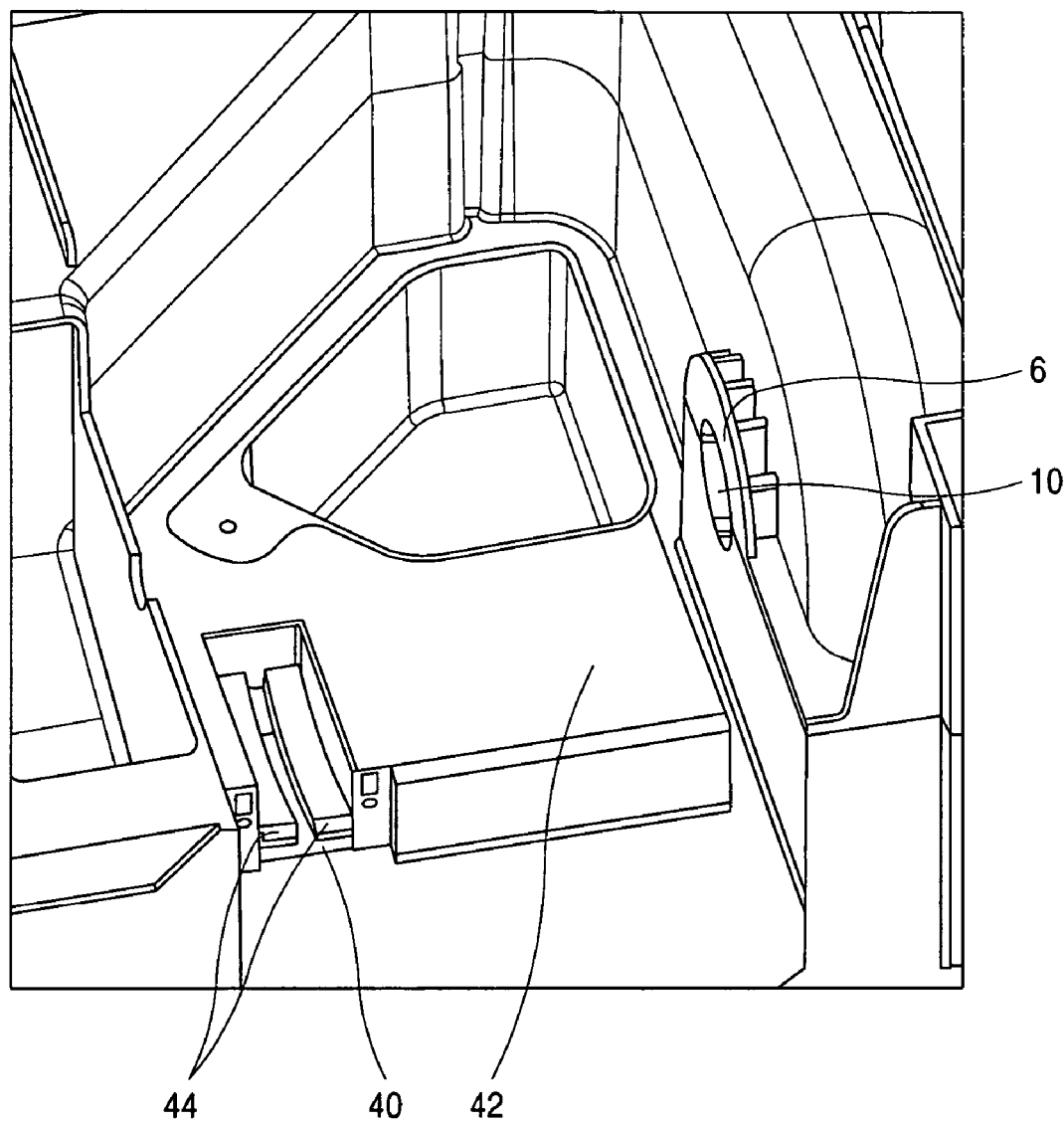
FIG. 8 is a partial perspective view of a case showing a motor mounting portion of the motor supporting apparatus according to the present invention.

As shown in FIG. 8, a motor mounting portion 42 for mounting the motor is formed at a bottom surface of the case 100. The motor mounting portion 42 is provided with the supporting rib 6 having the hub mounting portion 10 at one side thereof and is provided with an insertion groove 40 for inserting the sliding coupling portion 24 at another side thereof. A guide rib 44 having a circular arc shape and the same curvature radius as the sliding coupling portion 24 is formed at both sides of the insertion groove 40 in order to fit the engaging groove 38 of the sliding coupling portion 24.

Assembly processes and operation of the motor supporting apparatus of a clothing dryer according to the present invention will be explained as follows.

Figure 9:
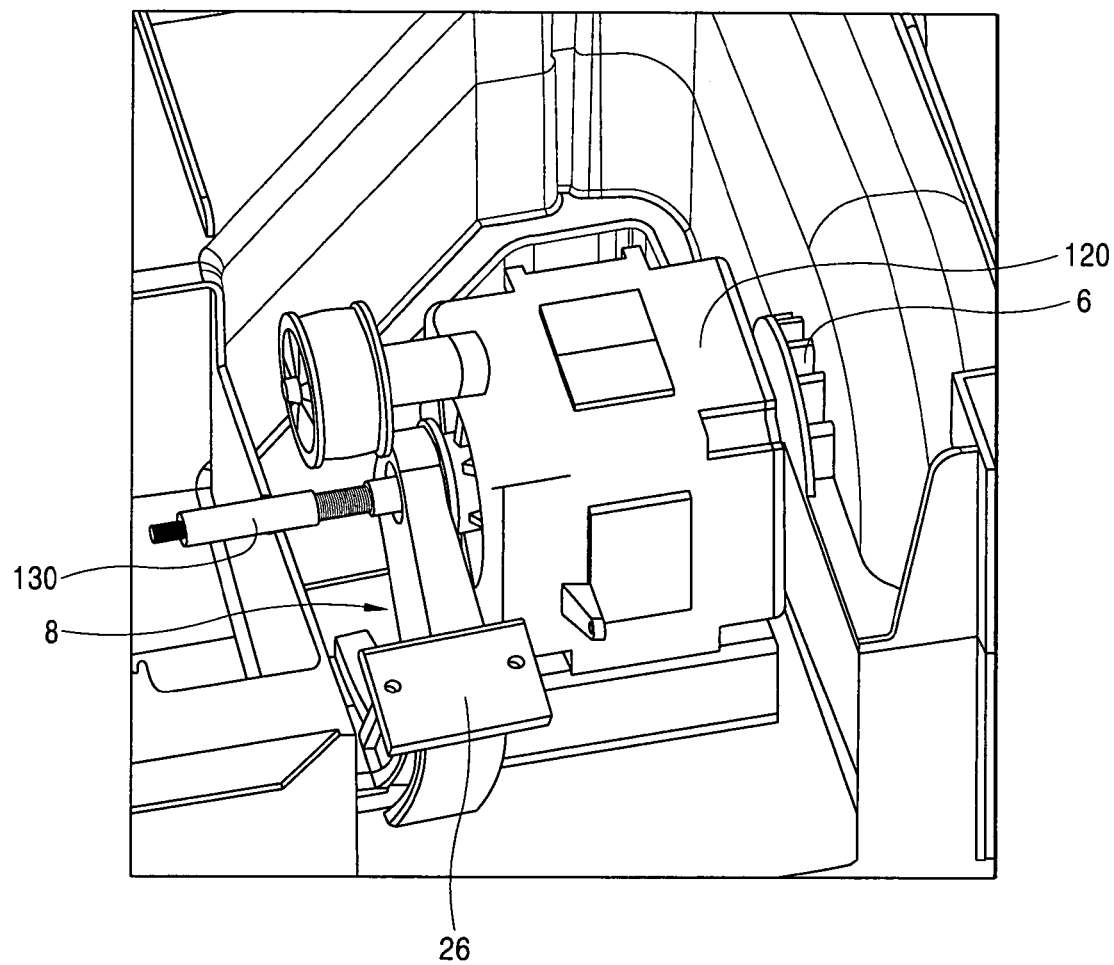
FIGS. 9 and 10 are perspective views showing a structure that a motor is coupled to the case by the motor supporting apparatus according to the present invention.
Figure 10:
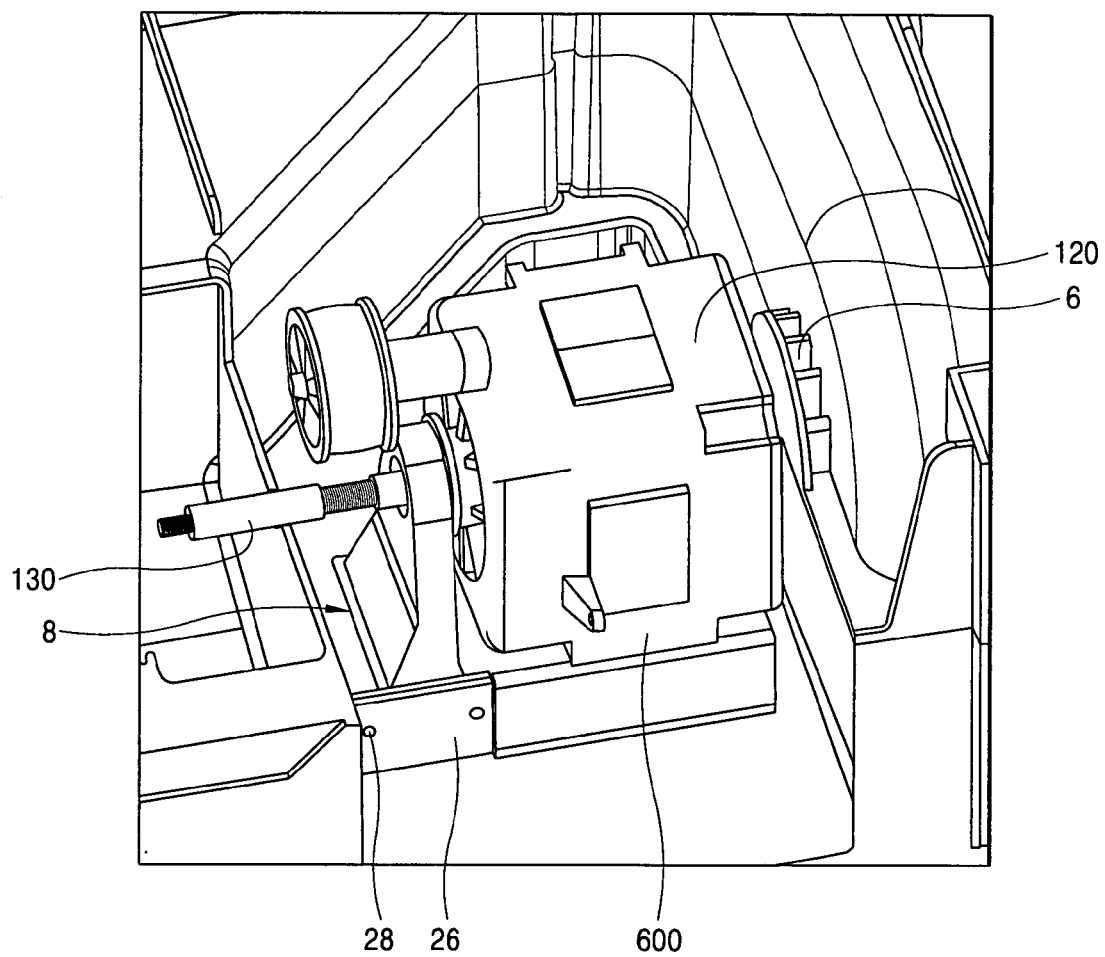

FIGS. 9 and 10 are perspective views showing a structure that a motor is coupled to the case by the motor supporting apparatus according to the present invention.

First, the motor 120 is mounted at the motor mounting portion 42 of the case 100, and then the first motor hub 2 is inserted into the hub mounting portion 10 of the supporting rib 6. Next, the rotation shaft 130 of the motor 120 is passed through the penetration hole 16 formed at the supporting rib 6. At this time, said process is performed in a state that the vibration-proof member 18 has been fitted to the outer circumferential surface of the first motor hub 2.

Under said state, the rotation shaft 130 is passed through the penetration hole 30 of the supporting member 8 thus to move the supporting member 8 to a lateral direction and insert the hub mounting portion 22 of the supporting member 8 into the second motor hub 4. Said process is also performed in a state that the vibration-proof member 32 has been fitted to the outer circumferential surface of the second motor hub 4.

Then, the supporting member 8 is rotated on the basis of the hub mounting portion 22 thus to fit the sliding coupling portion 24 of the supporting member 8 into the insertion groove 40 formed at the bottom surface of the case 100. According to this, the engaging groove 38 formed at the sliding coupling portion 24 is fitted into the guide rib 44 formed at the insertion groove 40.

Next, a bolt is coupled to the bolt coupling portion 26 formed at the supporting member 8 thus to fix the supporting member 8 to the case 100, thereby completing a motor mounting.

A motor disassembling process is performed by disassembling the motor with a reverse order of the motor assembling process.

In the motor supporting apparatus of a clothing dryer according to the present invention, the first motor hub of the motor is inserted in the supporting rib formed at the case, then the supporting member is inserted into the second motor hub positioned at an opposite side to the motor towards a lateral direction, and then the supporting member is rotated, thereby fixing the supporting member to the case by a sliding method. Accordingly, the assembling process is simple. Also, since the drum does not have to be disassembled at the time of assembling or disassembling the motor, a service performance and a mass production characteristic are enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor supporting apparatus of a clothing dryer comprising:
   first and second motor hubs respectively protruding at both sides of a motor;
   a supporting rib coupled to a clothing dryer case that supports the first motor hub; and
   a supporting member assembled at a lateral surface of the case and having a structure that is slidingly coupled to the case and supports the second motor hub.

2. The apparatus of claim 1, wherein the supporting rib is provided with a hub mounting portion of a cylindrical shape for inserting the first motor hub, and is integrally formed at the case.

3. The apparatus of claim 2, wherein a vibration-proof member is installed between an inner circumferential surface of the hub and an outer circumferential surface of the first motor hub.

4. The apparatus of claim 1, wherein the supporting member comprises:
   a body uprightly arranged at a bottom surface of the case;
   a hub supporting portion formed at an upper side of the body for inserting the second motor hub and supporting; and
   a sliding coupling position formed at a lower side of the body and sliding-coupled to the case.

5. The apparatus of claim 4, wherein a bolt coupling portion bolt-coupled to the body after the sliding coupling portion is sliding-coupled to the body is formed at a front side of the body.

6. The apparatus of claim 5, wherein the bolt coupling portion is integrally formed at a lateral side of the body as a flat plate shape and has a plurality of bolt coupling holes.

7. The apparatus of claim 4, wherein the hub supporting portion is integrally formed at an upper side of the body as a cylindrical shape to insert the second motor hub, and is provided with a penetration hole for passing the rotation shaft at one side thereof.

8. The apparatus of claim 7, wherein a vibration-proof member is installed between an outer circumferential surface of the second motor hub and an inner circumferential surface of the hub supporting portion.

9. The apparatus of claim 4, wherein the sliding coupling portion is formed as a circular arc shape having the same radius of curvature at a center of the hub supporting portion, and an engaging groove engaged to the case is formed in a length direction thereof.

10. The apparatus of claim 9, wherein an insertion groove of a circular arc shape for inserting the sliding coupling portion is formed at the case, and a guide rib coupled to the engaging groove is formed at both sides of the insertion groove in a length direction thereof.

11. The apparatus of claim 10, wherein a bolt coupling groove bolt-coupled to a bolt coupling portion formed at the supporting member is formed at a front side of the body.

12. A support attachment of a clothes dryer housing of a motor having hubs located at opposite sides of the motor, comprising:
   a rib coupled to the housing that supports one motor hub;
   a motor supporting member that supports the other motor hub, the motor supporting member including a sliding coupling portion that has a structure that is slidingly coupled to the housing.

13. The support of claim 12, wherein the sliding coupling includes an integrally attached bolt coupling portion.

14. A combination of the support of claim 12 and a support mounting element coupled to the support housing, wherein the mounting element includes a coupling portion to receive the sliding coupling portion of the motor supporting member.

15. The support member of claim 12, wherein the coupling portion of the motor supporting member includes a guide rib.

16. The support member of claim 12, wherein the coupling portion of the motor support member includes an insertion groove.

17. The combination of claim 14, wherein the mounting element coupling portion includes a guide rib.

18. The combination of claim 14, wherein the mounting element includes an insertion groove.

19. The support member of claim 15, wherein the guide rib has a circular arc shape.

20. The support member of claim 16, wherein the insertion groove has a circular arc shape.

* * * * *